United States Patent [19]

Sciamanda et al.

[11] Patent Number: 4,652,739
[45] Date of Patent: Mar. 24, 1987

[54] IMAGING APPARATUS

[75] Inventors: Robert J. Sciamanda; William R. Miller, both of Erie, Pa.

[73] Assignee: American Sterilizer Company, Erie, Pa.

[21] Appl. No.: 727,748

[22] Filed: Apr. 26, 1985

[51] Int. Cl.$^4$ ............................................. H01J 31/50
[52] U.S. Cl. ............................................. 250/213 R
[58] Field of Search ............... 250/213 R, 213 VT; 378/100

[56] References Cited

U.S. PATENT DOCUMENTS 4,376,889 3/1983 Swift ............................ 250/213 R Primary Examiner—Gene Wan
Attorney, Agent, or Firm—Robert D. Yeager; Edward L. Pencoske

[57] ABSTRACT

Imaging apparatus including an image intensifier and first and second assemblies for filtering or color encoding incident light before it is received by the image intensifier, and produced light emitted from the image intensifier, respectively. An objective lens and an eyepiece are provided for passing the incident light to the first filtering assembly and for passing the produced light to a predetermined location, preferably to an observer. The first and second filtering or encoding assemblies remove from the light, components falling within at least one predetermined range of frequencies. The filtering assemblies may be two disks, an input disk and an output disk, positioned on opposing sides of the image intensifier. Each disk may have one or more filters. Each filter is adapted for removing from the light all components except those having a wavelength falling within a predetermined range of wavelengths.

Alternatively, the filtering or encoding assemblies may be a cylinder that defines passages along its circumference through which light can pass. Each passage receives a filter. One or two image intensifiers and a member for rotating the cylinder about its longitudinal axis are positioned within the cylinder. In both embodiments, the filters are alternately and repetitively positioned between the image intensifier and the source of the incident light on the input side and between the image intensifier and the location to which the produced light is directed on the output side.

18 Claims, 9 Drawing Figures

IMAGING APPARATUS

BACKGROUND OF THE INVENTION

1. Field of the Invention

The present invention relates to imaging apparatus and, more particularly, to a color image intensifier.

2. Description of the Prior Art

Night vision devices, or image intensifiers, have been used by the military to amplify light output to give the human eye the capability of viewing a scene which the unaided eye cannot see. Such devices are also useful for surveillance by law enforcement officials and for underwater photography. All image intensifiers produce a monochromatic image. There has heretofore been no means for providing an intensified multicolor image.

One area in which image intensification is needed is surgery. Due to the inability to provide a color image however, image intensifiers have not been useful in aiding a surgeon's vision. The illumination of a surgical site can be increased by adding more light, but the heat produced from lighting apparatus can dry out tissue. Thus, standards have been established which limit the amount of watts which can be directed onto the surgical site.

There is a need for a device which will provide an intensified color image. There is a further need for such a device which will be useful in aiding a surgeon's vision or in providing an intensified color image for underwater photographers, the miltary or the police.

SUMMARY OF THE INVENTION

The present invention provides an imaging apparatus which adds color content to the output image presented to a viewer through an image intensifier. The colors in the output image may correspond on a one to one basis to the natural colors of the scene being viewed or may be any desired encoding of the spectral content of incoming radiation. The imaging apparatus can be adapted for encoding any kind of radiation.

The imaging apparatus includes amplifying means for receiving incoming light and for producing light that conveys images corresponding to the images conveyed by the incoming light. The intensity of the produced images is greater than the intensity of the images conveyed by the incoming light. The imaging apparatus also includes an input spectral encoding means for removing from incident light components which fall within at least one predetermined range of frequencies and an output spectral encoding means for removing from the produced light, components which fall within at least one predetermined range of frequencies. The input and output spectral encoding means are synchronized so that the component removal characteristics of the input encoding means matches the component removal characteristics of the output encoding means.

The imaging apparatus also provides a first lens through which the image conveyed by the incident light is passed to the input encoding means and then to the amplifying means. A second lens, or eyepiece, is also provided for receiving the image conveying produced light from the amplifying means and the output encoding means for viewing by an observer. The imaging apparatus may be adapted to accommodate monocular or binocular viewing.

The input and output spectral encoding means preferably include members, such as filters, which remove all components except those having a wavelength falling in a predetermined range of wavelengths.

The imaging apparatus also preferably includes means for alternately and repetitively interposing the input spectral encoding component removal members between the source of the incident radiation and the amplifying means to deliver to the amplifying means spectral portions of the images conveyed by the incident light, each image portion being constituted by radiation of a wavelength falling within one of the ranges of wavelengths, and for alternately and repetitively positioning the output spectral encoding component removal members in a location where the members can intercept the produced light to receive spectral image portions produced by the amplifying means conveyed by the produced light, each produced image portion corresponding to the image portion received by the amplifying means. The interposing and positioning means is adapted to ensure that the component removal characteristics of each produced light member matches the component removal characteristics of each member of the input encoding means that delivers to the amplifying means the incident image portions that correspond to the produced image portions received by the output encoding means.

The interposing and positioning means preferably includes a wheel assembly and means for rotating the wheel assembly. The wheel assembly may include an input disk and an output disk, each disk defining passages through which light can pass and each passage receiving a component removing member, such as a filter.

Alternatively, the wheel assembly may include a cylinder that defines passages along its circumference through which light can pass. Each passage receives a component removing member. Other spectral encoding techniques can also be employed, such as chromatic polarizers or dichroic mirrors in conjunction with electrically activated Pockel cells or liquid crystal shutters.

BRIEF DESCRIPTION OF THE DRAWINGS

The present invention can be better understood by reference to the attached drawings in which.

DETAILED DESCRIPTION OF THE PREFERRED EMBODIMENTS

FIGS. 1 through 9 illustrate several embodiments of the imaging apparatus 10 of the present invention.

In the preferred embodiment, the imaging apparatus 10 is a color image intensifier designed as a personal viewer for surgeons. The invention can be adapted to other uses. For example, the imaging apparatus can be used by welders, underwater photographers or by the police or the military to add color content to night vision devices.

The imaging apparatus 10 is not limited to the amplification and spectral encoding of visible light. Those skilled in the art will recognize that the apparatus can be adapted for use in processing radiation in a wide range of wavelengths. Thus, the term "light" as used herein shall mean any radiation, including but not restricted to X-ray radiation, visible light, gamma ray radiation, ultra violet light and infrared light.

Figure 1:
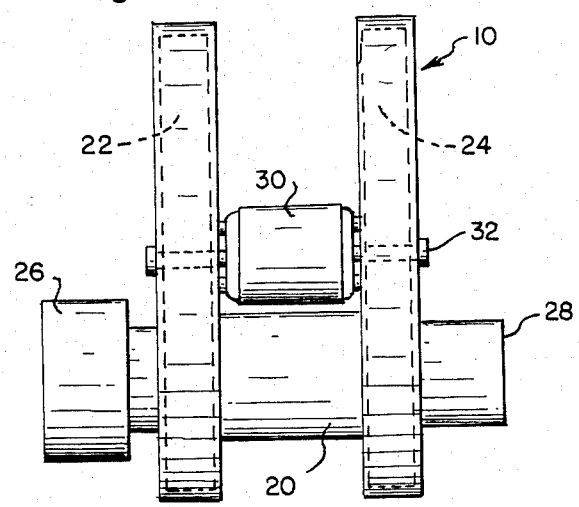
FIG. 1 is side elevation view of a monocular embodiment of the imaging apparatus of the present invention.
Figure 2:
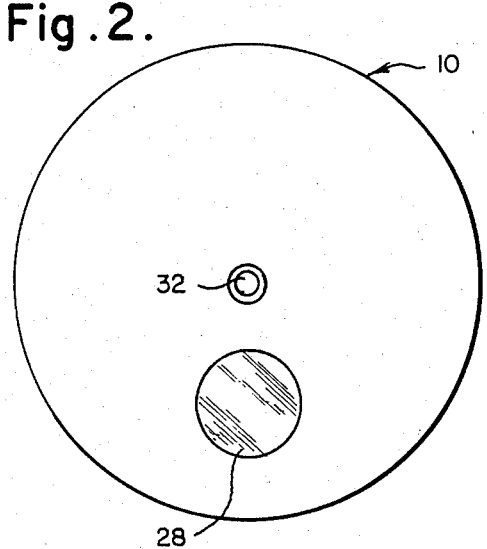
FIG. 2 is a frontal view of the imaging apparatus of FIG. 1.

A monocular, or single channel, version of the imaging apparatus 10 is illustrated in FIGS. 1 and 2. The apparatus 10 includes an image intensifier 20, an objective lens 26, an eyepiece 28, a motor 30 for rotating rod member 32 and a wheel assembly in the form of an input disk 22 and an output disk 24 mounted for common rotation on rod member 32.

The image intensifier 20 may be any device which intensifies the light content of an image. In the preferred embodiment, the image intensifier is a microchannel plate (MCP). Image intensifiers are well-known in the art and any suitable image intensifier may be used. Conventional image intensifiers include a green phosphor screen. The present invention requires an output phosphor capable of emitting light covering the entire desired output spectrum. The preferred embodiment employs a white phosphor so that a full color spectrum of amplified image conveying light is produced by the image intensifier 20.

Figure 3:
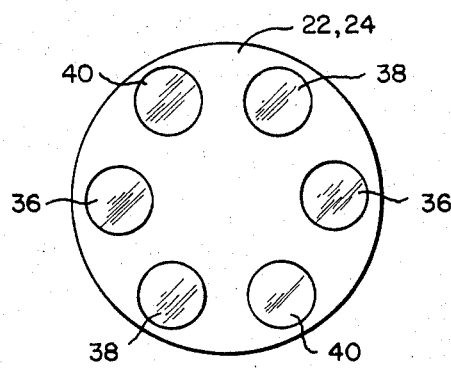
FIG. 3 is a schematic view of one disk of the imaging apparatus of FIG. 1.

The input and output disks 22 and 24 function as spectral encoding means. Referring to FIG. 3, each disk 22 or 24 preferably includes at least three filters 36, 38, and 40 adapted to filter red, green and blue light, respectively, to produce a full color spectrum. Any multiple of the sequence of filters 36, 38, and 40, not necessarily in that order, can be used on the disks 22 and 24. Filters 36, for example, will absorb everything but red light. Filters 38 will absorb everything but green light and filters 40, everything but blue light. For applications other than color image intensification, each filter can be constructed to absorb all light except that which falls within a desired predetermined range of frequencies or wavelengths. The particular range will depend upon the application. In some applications, one or two filters and multiples thereof or some other suitable member for absorbing components of radiation, may suffice.

Lens 26 and eyepiece 28 function in the same manner as a telescope. Lens 26 is an objective lens which receives incident image conveying light and forms an image which is projected through one of the filters 36, 38 or 40 on input disk 22 onto the photo cathode of the image intensifier 20. The output image produced by the image intensifier 20 forms on the white phosphor screen and passes through a filter 36, 38 or 40 on output disk 24 to the eyepiece 28. The observer views the phosphor screen through the appropriate filter on output disk 24 and through the eyepiece 28. In all applications of the imaging apparatus 10, both direct viewing by an observer and indirect use of the intensified color image are possible. The output image produced by the image intensifier 20 and passed through a filter 36, 38 or 40 can pass to eyepiece 28, a camera or some other predetermined location.

The input and output disks, 22 and 24, respectively, rotate about member 32 to provide sequential, synchronized color coding between the two disks. The image intensifier 20 remains stationary. Image conveying incident light impinging on lens 26 forms an image which is conveyed through one of the filters 36, 38 or 40 on input disk 22. As described above, the light is filtered, so that all components except red, green or blue light, are absorbed. Thus only the red, green or blue light is received by the image intensifier 20. For embodiments used to process other than visible light, there may be different filtering characteristics. The produced light is then filtered by the appropriate filter to absorb all components from the white produced light except those falling within the desired wavelength. Thus, red, green or blue light is passed through the eyepiece 28 for viewing by the observer. The image conveyed by the produced light corresponds to the image conveyed by the received light, which in turn, corresponds to the image conveyed by the incident light.

In the embodiment of the present invention used to color intensify visible light, the filter in output disk 24 through which the produced light passes has the same filtering characteristics as the filter in input disk 22 through which that portion of light initially passed.

The rotating disks alternately and repetitively position the filters between the source of incident light and the image intensifier 20 on the input side to deliver to the image intensifier 20 spectral portions of the images conveyed by the incident light which fall within the desired range of wavelengths. The rotating disks also alternately and repetitively position the filters on the output disk 24 in a location where the appropriate filter can intercept the produced light to receive the image portions produced by the image intensifier 20 conveyed by the produced light. The disks rotate fast enough so that the image spectral portions are perceived by the observer to merge into a single intensified color image.

Figure 6:
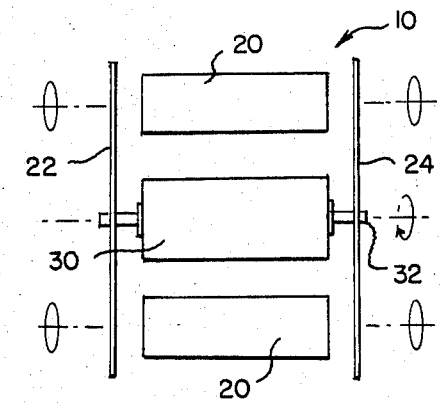
FIG. 6 is a schematic view of a binocular modification of the imaging apparatus of FIG. 1.

FIG. 6 illustrates schematically the binocular or dual channel embodiment of the imaging apparatus of FIG. 1. There are dual image intensifiers 20 and binocular lenses 26 and eyepieces 28. The binocular embodiment is preferred for the ease of viewing offered to the observer.

Figure 4:
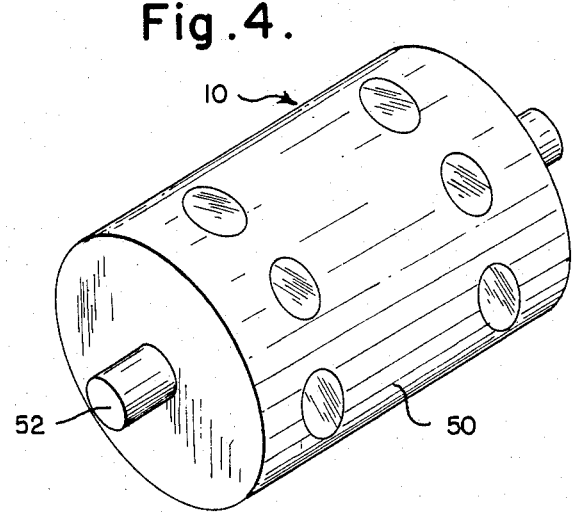
FIG. 4 is a perspective view of a binocular embodiment of the imaging apparatus of the present invention.
Figure 5:
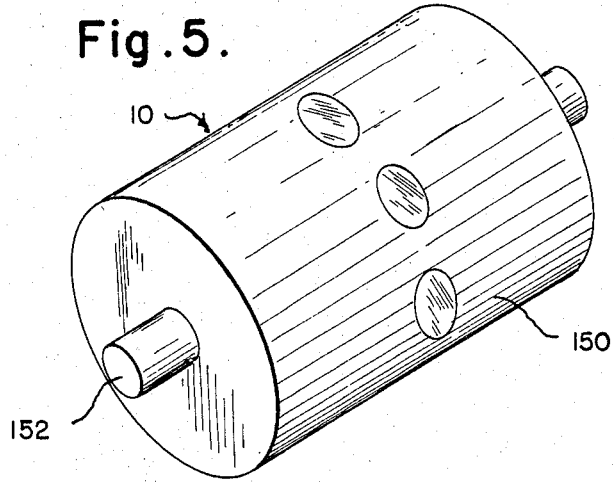
FIG. 5 is a perspective view of another embodiment of the imaging apparatus of the present invention.

FIGS. 4 and 5 illustrate alternative embodiments of the imaging apparatus 10. The image intensifier 20 includes an image inversion in order to compensate for the inversion produced by the objective lens 26. The input, or incident light receiving filters and the output, or produced light filters must scan the received and produced images in opposite directions. This can be acheived in various ways. The input and output disks 22 and 24 could be arranged to rotate in opposite directions using an appropriate gearing mechanism. The embodiments shown in FIG. 4 and 5 provide yet another way to scan in opposite directions. The wheel assembly is in the form of a cylinder 50 or 150. The filters can be mounted within passages on the rotating cylinder 50 or 150 so that the input, or incident light filter is moving up as the output, or produced light filter is moving down. The cylinder 50 or 150 is mounted on a member 52 or 152 about which the cylinder 50 or 150 rotates. The member 52 or 152 is coaxial with the longitudinal axis of cylinder 50 or 150.

Figure 7:
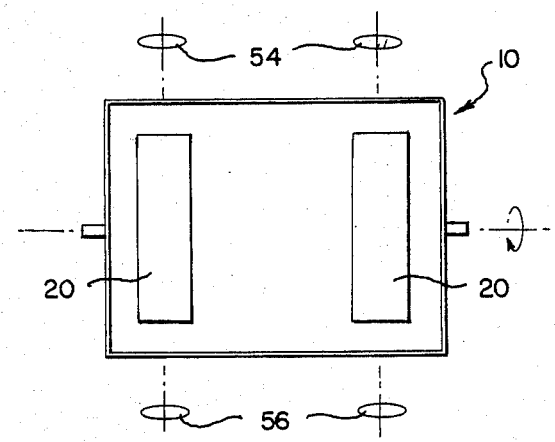
FIG. 7 is a schematic view of a modified form of the imaging apparatus of FIG. 4.

In the binocular embodiment shown in FIG. 4 and illustrated schematically in FIG. 7, two image intensifiers 20 are mounted within cylinder 50, each in a parallel relationship relative to each other and perpendicular to the longitudinal axis of cylinder 50. A motor (not shown) rotates cylinder 50. Two rows of passages along the circumference of cylinder 50 receive filters corresponding to the filters described above in input and output disks 22 and 24. Each row of filters is brought into alignment with the light receiving and producing ends of one of the image intensifiers 20 in a cyclical fashion as the cylinder 50 rotates about member 52.

Incident light passes through a pair of lenses 54 to each of the filters as each filter is alternately and repetitively interposed between the lenses 54 and the image intensifier 20 by the rotation of cylinder 50.

A pair of eyepieces 56 are positioned to intercept the produced light from the image intensifier 20 by the rotation of cylinder 50. The position of the filters on cylinder 50 provides the synchronization required for the imaging apparatus 10. The eyepieces 56 and the lenses 54 function in the same manner as the eyepiece 28 and the lens 26 in the monocular embodiment described above.

Figure 8:
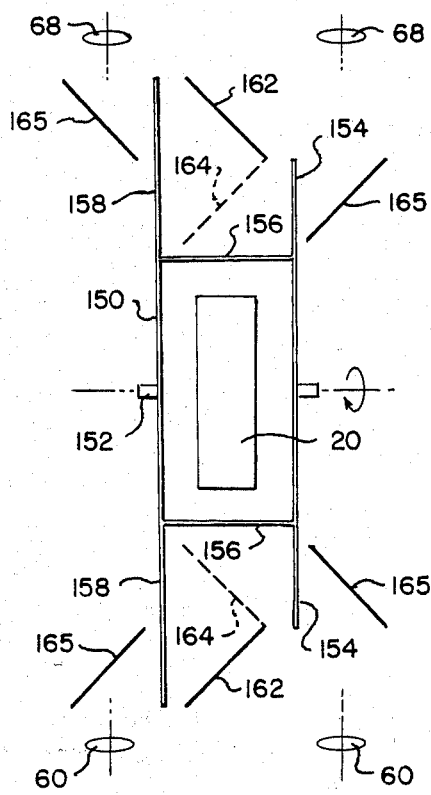
FIG. 8 is a schematic view of a modified form of the imaging apparatus of FIG. 5.
Figure 9:
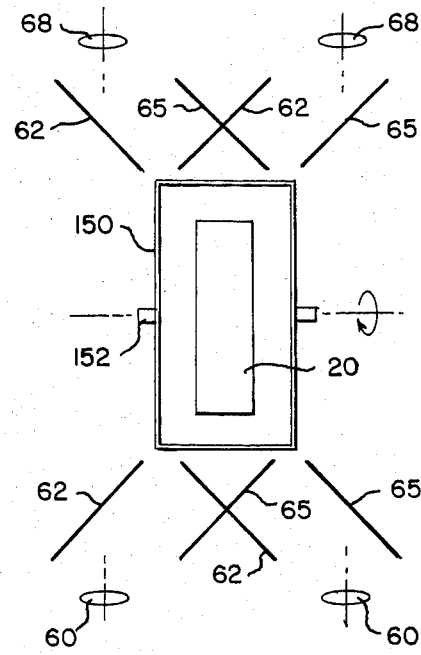
FIG. 9 is a schematic view of an alternative modification of the imaging apparatus of FIG. 5.

In the embodiment of imaging apparatus 10 shown in FIGS. 5, 8 and 9, the cylinder 150 has a single circumferential row of passages for receiving filters. Only one image intensifier 20 is mounted within the cylinder 150. This embodiment of imaging apparatus 10 provides an improvement in economy by using one image intensifier 20 and multiplexing it between the right and left optical channels.

A modification of the embodiment shown in FIG. 5, is illustrated schematically in FIG. 8. It includes shutters cut into flanges 154 and 158 on the cylinder 150 along with suitably arranged mirrors 162 or 165 and beam splitters 164. Color filters may be mounted in holes on the flanges 154 and 158 as part of the shutters. If that is done, the surface 156 of the cylinder 150 can be eliminated.

Referring to FIG. 8, the flanges 154 and 158 are part of the cylinder 150 and rotate with it. The flanges are of different lengths to act alternately and repetitively as shutters for receiving and blocking light reflected from one of the outwardly extending mirrors 165. The mirrors 162 or 165 and beam splitters 164 are stationary, as are the lenses 60, eyepieces 68 and image intensifier 20. A support (not shown) can be provided to maintain the stationary items in a constant position relative to the incident light. Light passes through the right hand lens 60 of FIG. 8 and strikes a mirror 165. The light is reflected to the left at a right angle from mirror 165 through a hole in the shorter flange 154 to a beam splitter 164. The light is split and a portion is reflected at a right angle through a filter on surface 156 of cylinder 150 to the image intensifier 20, where amplified light is produced, passed through a corresponding filter on the cylinder 150 to beam splitter 164. A portion of the light is reflected to the right at a right angle through a hole in flange 154 to mirror 165 and then reflected at a right angle to eyepiece 68.

When flange 154 is aligned to permit light reflected from mirror 165 to pass through, flange 158 is aligned to block light reflected from its mirror 165 to a second parallel mirror 162. Alternatively, when light is permitted to pass through flange 158 to mirror 162 and beam splitter 164, flange 154 blocks light entering through the right hand channel.

FIG. 9 illustrates a modification of the multiplexing imaging apparatus. Mirrors 62 and 65 are staggered in position around the circumference of cylinder 50 and rotate with cylinder 50. Each associated pair of mirrors 62 and 65 are parallel to each other. The subsequent, staggered pair of mirrors 62 and 65 are perpendicular to the preceding pair and parallel to each other. Light entering the left hand channel, passes through left hand lens 60 to mirror 62 where it is reflected to the right at a right angle onto parallel mirror 65. The light impinging upon mirror 65 is reflected at a right angle to the input filter on the surface of cylinder 50, to the image intensifier 20. Produced light passes through a corresponding filter to mirror 65 where it is reflected to the left at a right angle to parallel mirror 62 and then reflected through eyepiece 68.

Light passing through the right hand channel travels a similar path through the right hand lens 60, parallel mirrors 65 and 62 and eyepiece 68.

In a final modification, electrically activated shutters can be used to perform the sequential color encoding function of the rotating filter disks or cylinder. A nonmechanical system developed by Textronix, Inc. uses colored polarizers and liquid crystal shutters in combination with a monochrome oscilloscope.

The imaging apparatus 10 provides the combination of a sequential color encoding apparatus plus a light amplification device. The combination of the encoding apparatus and the light amplification device, each of which can take any suitable form, provide color image intensification not previously available. Besides the mechanical color filters, the spectral encoding means can be a nonmechanical, electrically activated device which includes means for separating image conveying light into spectral components, such as color polarizers or dichroic mirrors, and means for sequentially activating each of the spectral components before the image conveying light enters and after it leaves, the image intensifier 20, such as a liquid crystal shutter or a Pockel cell.

What is claimed is:

1. Imaging apparatus comprising in combination:
   at least one image intensifier for receiving and emitting image conveying light, the images conveyed by said emitted light being of a greater intensity than the images conveyed by said received light;
   a first assembly for color encoding image conveying incident light and directing such color encoded light to said image intensifier; and
   a second assembly for color decoding image conveying light emitted from said image intensifier and for outputting said color decoded emitted light, said first and second assemblies working in unison so that said color decoded emitted light is an amplified version of said image conveying incident light containing substantially all the color information contained in said image conveying incident light.

2. Apparatus as recited by claim 1 wherein said first and second assemblies each include at least three color filters sequentially positioned to receive said image conveying light before it enters and after it leaves, respectively, said image intensifier to produce an image corresponding to said image conveyed by said incident light, said produced image being of a greater color intensity than said image conveyed by said incident light.

3. Apparatus as recited by claim 1 wherein said first and second assemblies each include means for separating said image conveying incident light into its spectral components;
   means for sequentially transmitting each of said spectral component;

said separating means and said sequentially transmitting means being electrically activated and being positioned to receive said image conveying light before it enters and after it leaves, respectively, said image intensifier to produce an image corresponding to said image conveyed by said incident light, said produced image being of a greater color intensity than said image conveyed by said incident light; and means to selectively activate said separating means and said sequentially transmitting means.

4. Apparatus as recited by claim 3 wherein said separating means includes a set of color polarizers.

5. Apparatus as recited by claim 3 wherein said sequentially transmitting means includes a Pockel cell.

6. Apparatus as recited by claim 3 wherein said sequentially transmitting means includes a liquid crystal shutter.

7. Imaging apparatus responsive to an input image containing frequency information, said apparatus comprising:

first means for receiving the input image and for transmitting portions of the frequency information at predetermined times;

intensifying means responsive to said first means for producing an intensified image containing frequency information; and second means for receiving said intensified image and for transmitting said portions of the frequency information at predetermined times coinciding with said predetermined transmission times of said first means such that an intensified output image which contains substantially the same frequency information as the input image is produced.

8. The imaging apparatus recited by claim 7 wherein the frequency information corresponds to color information.

9. The imaging apparatus recited by claim 7 wherein said first means includes a first filter for transmitting a portion of the input image that falls within a first frequency range and a second filter for transmitting a portion of the input image that falls within a second frequency range, and wherein said second means includes a third filter for transmitting a portion of the intensified image that falls within said first frequency range and a fourth filter for transmitting a portion of the intensified image that falls within said second frequency range.

10. The imaging apparatus recited by claim 9 wherein said intensifying means includes an input end and an output end, and wherein said first means includes third means for alternately and repetitively positioning said first and second filters at said input end of said intensifying means thereby establishing the predetermined times for transmitting the portion of the input image that falls within said first and second frequency ranges, respectively, and wherein said second means includes fourth means for alternately and repetitively positioning said third and fourth filters at said output end of said intensifying means thereby establishing the predetermined times for transmitting the portion of the intensified image that falls within said first and second frequency ranges, respectively.

11. The imaging apparatus recited by claim 10 wherein said third and fourth means includes input and output wheel assemblies, respectively, and means for rotating said wheel assemblies in unison.

12. The imaging apparatus recited by claim 11 wherein:

said input wheel assembly comprises an input disk and said output in wheel assembly comprises an output disk, said input disk defining passages through which light can pass, each said input passage carrying one of said first and second filters, said output disk defining passages through which light can pass, each said output passage carrying one of said third and fourth filters.

13. The imaging apparatus recited by claim 10 wherein:

said third and fourth means includes a cylinder that defines a first set of passages along its circumference through which light can pass, each said passage carrying one of said first, second, third, and fourth filters;

said third and fourth means also including means for rotating said cylinder; and said intensifying means being mounted within said cylinder.

14. The imaging apparatus as recited by claim 13 wherein said cylinder defines a second set of passages along its circumference through which light can pass, each of said passages carrying one of a fifth, sixth, seventh, and eighth filters corresponding to said first, second, third, and fourth filters, respectively, and wherein said intensifying means includes a pair of image intensifiers, each said image intensifier positioned within said cylinder in a parallel relationship relative to the other and perpendicular to the longitudinal axis of said cylinder so as to be responsive to one of said first and second sets of passages to provide a stereo intensified output image.

15. The imaging apparatus as recited by claim 13 wherein said intensifying means includes a single image intensifier;

said means for rotating said cylinder such that said filters are brought into alignment with said image intensifier in a cyclical fashion;

said imaging apparatus additionally comprising; a first pair of lenses through which said input image passes before impinging upon one of said filters;

a second pair of lenses through which said intensified image passes after passing through one of said filters; and means associated with said cylinder for alternately and repetitively directing said input image from each said lens of said first pair of lenses onto one of said filters as said filters are brought into alignment with said image intensifier, and for alternately and repetitively directing said intensified image from said filters as said filters are brought into alignment with said image intensifier to each said lens of said second pair of lenses to provide a stereo intensified output image.

16. The imaging apparatus as recited by claim 15 wherein said alternate and repetitive directing means includes a plurality of mirrors positioned in staggered fashion about the circumference of said cylinder to rotate therewith, said mirrors being brought into alignment with said lenses of said first and second pairs of lenses in said staggered and cyclical fashions to so alternatively and repetitively pass said input image and said intensified image.

17. The imaging apparatus as recited by claim 15 wherein said image intensifier includes a microchannel plate amplifier having a white phosphor output screen.

18. Imaging apparatus as recited by claim 15 wherein said first and second pairs of lenses define first and second channels for passing said input image and said intensified image, respectively; and said alternate and repetitive directing means comprises first and second shutters mounted for rotation with said cylinder and a plurality of mirrors and beam splitters fixedly positioned relative to said first and second channels so that the rotation of said first shutter aligns said first shutter with said first channel in said cyclical fashion, such aligning permitting light to pass through said first channel, and the rotation of said second shutter aligns said second shutter with said second channel in said cyclical fashion, such aligning permitting light to pass through said second channel, said first and second shutters being staggered relative to each other to alternately and repetitively align with said first and second channels.

* * * * *